United States Patent [19]
Casas

[11] Patent Number: 6,009,754
[45] Date of Patent: Jan. 4, 2000

[54] CARRIER FOR PIPE AND LINE LOCATOR

[76] Inventor: Jose G. Casas, 1424 Adelman, Joliet, Ill. 60435

[21] Appl. No.: 08/932,759

[22] Filed: Sep. 17, 1997

[51] Int. Cl.[7] .............................. G01H 3/00; G01R 19/00
[52] U.S. Cl. ................................ 73/592; 324/67; 324/326
[58] Field of Search ............................. 73/592, 627, 661, 73/81; 324/67, 326

[56] References Cited

U.S. PATENT DOCUMENTS

| | | | |
|---|---|---|---|
| 3,653,050 | 3/1972 | Eggleston, Jr. ............................. | 324/67 |
| 5,617,031 | 4/1997 | Tuttle ....................................... | 73/592 |
| 5,644,237 | 7/1997 | Eslambolchi et al. .................. | 324/326 |

*Primary Examiner*—Hezron Williams
*Assistant Examiner*—Thuy Vinh Tran
*Attorney, Agent, or Firm*—Lloyd L. Zickert

[57] ABSTRACT

This invention relates to a carrier for a pipe and line locator which facilitates the use and operation of the locator in that the carrier includes a grounding rod for making it easy to connect a grounding output of the transmitter to ground, thereby enhancing the efficiency of using the locator. The grounding rod on the locator is associated with the handle that is used to lift and transport the carrier and to cause penetration of the ground with the grounding rod upon placing the carrier with the locator on the ground.

15 Claims, 1 Drawing Sheet

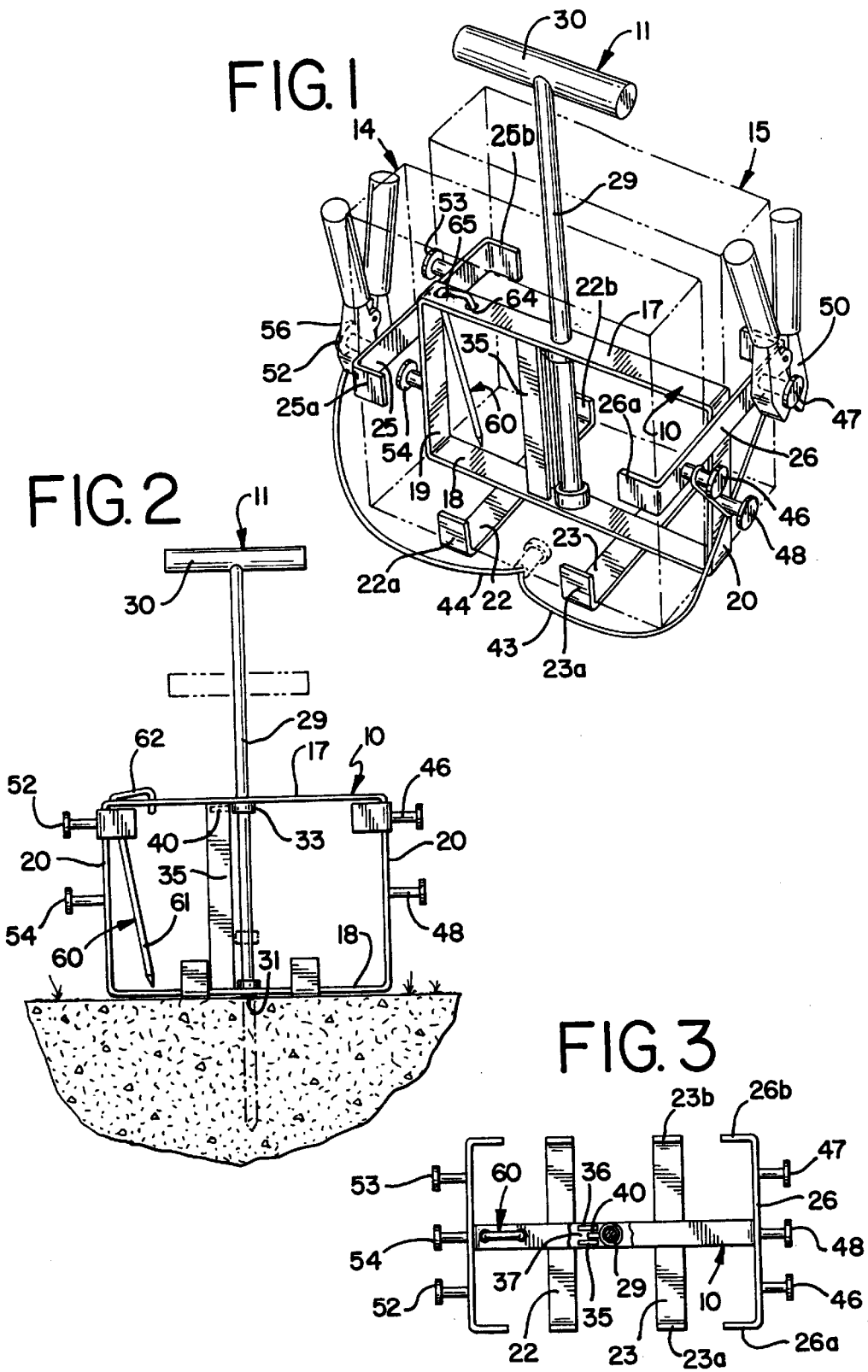

6,009,754

CARRIER FOR PIPE AND LINE LOCATOR

DESCRIPTION

This invention relates in general to a carrier for a pipe and line locator that includes a transmitter and a receiver, and more particularly to a carrier for such a locator that facilitates the connection of the grounding lead of the transmitter to ground, and still more particularly to a carrier having a grounding rod that can easily be inserted into the ground and through the frame then be connected to a ground lead for the transmitter.

BACKGROUND OF THE INVENTION

A pipe and line locator includes a transmitter and a receiver. The use of the locator includes the connection of one lead from the transmitter to a pipe or line considered to be a signal lead, and the connection of another lead from the transmitter to ground. After setting up the transmitter, a receiver is manually transported to find the line or pipe by receiving a signal from the transmitter along the line or pipe. for example, if a line or pipe is underground between two stations, such as an electric meter and a transformer, the electric meter will have one end of the line or pipe above ground, to which may be electrically connected the signal lead from the transmitter while the ground lead from the transmitter is then connected to ground. Operation of the transmitter then allows a worker with the receiver to transverse the ground where the line is located and determine the exact location so that it may be marked. When it is marked, it signals other workers not to disturb the land around that line in the event that further underground digging is desired for another purpose.

The systems for transporting and using a locator have included placing them in a box or container for transfer from a truck or the like to a job site, or the placement of a locator in a carrying bag. Thereafter, it becomes a problem when it is desired to connect the ground lead of the transmitter to ground.

SUMMARY OF THE INVENTION

The present invention overcomes the problem of easily handling a pipe and line locator including a transmitter and receiver and in the connection of the ground lead from a transmitter to ground. The present invention includes a carrier made of conductive material that includes pockets or cavities for removably and freely receiving the transmitter and the receiver and a handle that facilitates the transport of the carrier and also includes a grounding rod for easily grounding the carrier once the carrier is placed upon the ground. The handle includes a grounding rod which is driven into the ground when the carrier is placed on the ground and then the carrier is grounded. Thereafter, the ground lead from the transmitter may merely be electrically connected in a suitable manner to the frame of the carrier.

Further, it is very easy to disengage the grounding rod from the ground by lifting the handle and thereafter using the handle for transferring the carrier to another location or back to the service truck.

It is therefore an object of the present invention to provide a carrier for a pipe and line locator that facilitates the efficient use of the locator and also facilitates the grounding of the ground lead of the transmitter.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 1 is a perspective view of the carrier of the present invention and showing a transmitter and receiver in phantom and the leads from the transmitter in solid lines to illustrate the handling of the leads when transporting the locator;

FIG. 2 is a side elevational view of the carrier of FIG. 1 and also illustrating the grounding of the grounding rod in phantom as the carrier is placed upon the ground; and FIG. 3 is a top plan view of the carrier of FIGS. 1 and 2 with parts broken away to show underlying parts.

DESCRIPTION OF THE INVENTION

Referring now to the drawings, the carrier of the invention includes a frame 10 and a handle 11.

The frame 10 defines pockets for a transmitter 14 and a receiver 15 of a pipe and line locator. The transmitter and receiver are shown in phantom in FIG. 1.

The frame 10 includes a rectangular member having upper and lower straps or bars 17 and 18 respectively and opposed straps or bars 19 and 20. Bottom supporting straps or bars 22 and 23 are suitably secured to the lower strap of the rectangular frame part 10. The bottom supporting straps 22 and 23 have their opposed ends upturned at 22a, 22b and 23a, 23b. Similar side support straps or bars 25 and 26 are suitably secured to the upper ends of the opposed st raps 19 and 20 of the frame 10 and of the same shape as the bottom supporting straps 22 and 23. The side supporting straps also include upturned or inturned ends 25a, 25b and 26a, 26b.

The upturned ends on the bottom and side supporting straps coact with the rectangular frame 10 to define side-by-side pockets or cavities for loosely accepting the transmitter 14 and receiver 15, as seen particularly in FIG. 1.

The handle 11 includes a grounding rod 29 and a cross rod 30 at the upper end of the grounding rod. The lower end of the grounding rod 29 is pointed at 31 to facilitate penetration into the ground. Thus, the grounding rod and the crossbar 30 constitute the handle 11. The grounding rod is slidably and telescopically received in aligned holes formed in the upper and lower straps 17 and 18 of the frame 10. A collar 33 is secured to the grounding rod at a point such that, when the handle is in the up position as shown in solid lines in FIGS. 1 and 2, the collar engages against the underside of the upper strap 17 of the frame, whereby lifting of the carrier can be done when it is desired to transport the carrier between locations.

In order to prevent rotation of the handle 11 relative to the frame 10, a pair of vertical guide bars 35 and 36 are preferably mounted between the upper and lower straps 17 and 18 of the frame 10. These guide bars are suitably secured at their ends to the straps 17 and 18 and define therebetween a guideway 37 for freely receiving in guiding relation a pin 40 that is secured to and extends from the collar 33 mounted on the grounding rod 29. Moreover, the guide bars 35 and 36 provide additional reinforcement to the frame as they connect the upper and lower straps 17 and 18. Further, the guide pin assists in maintaining orientation of the carrier when it is transported by a person.

At the opposite ends of the carrier headed pins or bolts are provided to store the ends of the leads from the transmitter and the alligator clips or clamps connected to the leads. As seen in FIG. 1, leads 43 and 44 extend from the transmitter 14. The leads go to opposite ends of the carrier where they can be stored on the pins. The lead 43 is wrapped around three pins 46, 47 and 48. The pins 46 and 47 extend from the outer face of the side supporting strap 26, while the pin 48 extends from the outer face of the frame strap 20. The three pins are triangularly located and can serve to allow the end of the lead 43 to be wrapped around the pins. Also, since the very end of the lead 43 terminates with an electrical allegator clip or clamp 50, the clip 50 can be stored on one of the pins and is shown in storage position on pin 47. Similarly, the lead 44 can be directed to the other end of the carrier and stored on pins 52 and 53 mounted on the side supporting strap 25 and pin 54 mounted on the vertical frame strap 19. Thus, the storage pins on both ends of the carrier are symmetrically arranged. An alligator clip 56 is provided at the end of the lead 44. It will be appreciated that the alligator clips facilitate the electrical connection of the leads 43 and 44 to a pipe or line and to ground. For example, if lead 43 is considered to be the signal lead from the transmitter, alligator clip 50 would be connected to a pipe or line the location of which is being determined. The alligator clip 56 of lead 44 which would be the ground lead would be connected to a pin of the carrier which is made of a suitable electrically conductive material. While the carrier parts may be made of any suitable electrically conductive material, it will be appreciated that it is preferably made of metal such as steel to provide sufficient strength, although it could be made of aluminum if desired. When made of steel, it can be appreciated that the various straps can be easily welded onto the central frame member 10. Also, the guide members and the pins may be welded to the frame member 10 and the supporting straps.

In operation, the carrier would be loaded with a transmitter and receiver and an operator would grasp the handle 11 and transfer the carrier with the pipe and line locator to a site where it would be used. When placing the carrier on the ground, the operator would depress the handle 11 to cause the ground rod to penetrate and engage the ground, as shown in phantom in FIG. 2, thereby connecting the carrier electrically to ground. Thereafter, the operator would connect the signal lead to a pipe or line and leave the alligator clip for the ground lead connected to the carrier. Then the receiver would be removed from the carrier and manipulated to locate the line. After usage, the alligator clip for the signal lead and the lead would be placed back on the carrier. Lifting the handle would disengage the grounding rod from the ground and automatically retract the grounding rod into the carrier. Continual sliding of the grounding rod in the carrier would assure the rod to be electrically connected to the carrier by scrubbing the rod and associated frame surfaces to remove oxides. Further, the dimensioning of the rod frame holes receiving the rod would be such as to maintain good electrical connection therebetween.

In the event that it would not be possible to use the grounding rod such as on a hard surface, a grounding pin 60 is provided on the carrier which could be easily removed to a ground area and to which the grounding alligator clip 56 would be connected. The grounding pin 60 includes a grounding shaft 61 and an L-shaped head 62. In order to store the grounding pin 60 on the carrier, a pair of holes 64 and 65 are provided in the upper strap 17 of the frame to receive the grounding shaft and L-shaped head. Thus, the grounding pin 60 is used where it would be impossible to use the grounding rod 29 of the handle 11.

It will be understood that modifications and variations may be effected without departing from the scope of the novel concepts of the present invention, but it is understood that this application is to be limited only by the scope of the appended claims.

The invention is hereby claimed as follows:

1. A carrier for a pipe and line locator, wherein said locator includes a transmitter and a receiver, said carrier comprising: a frame having a first pocket for said transmitter and a second pocket for said receiver, said pockets being arranged in side-by-side relation, said receiver pocket allowing easy removal of the receiver from the carrier, a handle mounted on said frame, said handle including an upstanding shaft of conductive material, means on the frame for slidably receiving said shaft such that when lifting the carrier by the handle the shaft slides to an upper position relative to the frame and when placing the carrier on the ground a downward force on the shaft causes sliding the shaft to a lower position relative to the frame and penetration of the ground thereby establishing an electrical ground with the shaft, whereby said transmitter may be connected to ground through said shaft.

2. The carrier of claim 1, wherein said frame includes means for storing wire leads from said transmitter.

3. The carrier of claim 1, wherein said frame includes means for storing a removable ground pin.

4. The carrier of claim 1, wherein said frame is made of conductive material.

5. The carrier of claim 4, wherein said frame is metal.

6. In combination with a pipe and line locator having a box-shaped transmitter and a box-shaped receiver, said transmitter having a first output lead adapted to be connected to a pipe or line and a second output lead adapted to be connected to ground to apply a signal to the pipe or line, the improvement in a carrier for said locator having means for connecting the second output lead to an earth ground, said means including a handle, a ground penetrating rod extending from the handle, and connecting means on said second output lead for selective connection to said rod.

7. The carrier of claim 6, which further includes a removable ground pin to coact with said connecting means and provide an earth ground for said second output lead.

8. The carrier of claim 6, which further includes means for storing said output leads.

9. The carrier of claim 6, wherein the entire carrier is made of conductive material.

10. The carrier of claim 6, which further includes means for removably receiving said receiver so that it may be easily removed when tracing a line.

11. A carrier for an underground pipe and line locator, wherein the locator incudes a transmitter and a receiver, and the transmitter including a power or signal lead having means for removable connection to a pipe or line and a ground lead having means for connecting to ground, said carrier comprising: a frame of conductive material having pockets for removably receiving the transmitter and the receiver, said means of said ground lead electrically connectable to the frame, a handle mounted on the frame, said handle having a grounding rod slidably mounted on the frame and electrically connected to the frame, whereby driving the grounding rod into the ground effectively grounds the frame.

12. The carrier of claim 11, wherein said frame includes means for storing the leads.

13. The carrier of claim 11, wherein the carrier is made of steel.

14. The carrier of claim 11, wherein said frame includes a slideway for receiving said grounding rod which causes a wiping action on the grounding rod to enhance electrical conduction between the rod and the frame.

15. The carrier of claim 14, which further includes means preventing relative rotation between said carrier and said grounding rod.

\* \* \* \* \*